US012740905B2

(12) United States Patent
Pearson

(10) Patent No.: US 12,740,905 B2
(45) Date of Patent: Sep. 22, 2026

(54) MEDICAL JACK STAND

(71) Applicant: Zackery Michael Pearson, Phoenix, AZ (US)

(72) Inventor: Zackery Michael Pearson, Phoenix, AZ (US)

(*) Notice: Subject to any disclaimer, the term of this patent is extended or adjusted under 35 U.S.C. 154(b) by 0 days.

(21) Appl. No.: 18/977,620

(22) Filed: Dec. 11, 2024

(65) Prior Publication Data

US 2026/0157906 A1 Jun. 11, 2026

(51) Int. Cl.

| | |
|---|---|
| ***A61G 13/12*** | (2006.01) |
| ***A47C 3/20*** | (2006.01) |
| ***A47C 4/20*** | (2006.01) |

(52) U.S. Cl.

CPC .................................. *A61G 13/121* (2013.01)

(58) Field of Classification Search

CPC .......... A61G 7/065–0755; A61G 13/12–1295; A61G 5/12–128; A47C 7/004; A47C 7/006; A47C 3/20; A47C 3/30; A47C 3/40; A47C 7/021; A47C 7/42; A47C 7/0213; A47C 9/105; A47C 9/002; A47C 16/02; A47C 16/025; A47C 4/20; A47C 4/286; F16M 11/28; F16M 13/00

See application file for complete search history.

(56) References Cited

U.S. PATENT DOCUMENTS 583,338 A * 5/1897 Birdsall
4,054,282 A * 10/1977 Hamer ............... A61G 13/0045 5/610
4,909,264 A * 3/1990 Wadsworth, III .. A61G 13/0063 128/877
7,216,382 B2 * 5/2007 Newkirk .............. A61G 13/107 5/503.1
11,122,902 B2 * 9/2021 Leng ...................... A47C 7/004
2002/0117878 A1 * 8/2002 Fox ........................ A47C 4/286 297/16.2
2004/0212238 A1 * 10/2004 Chen ...................... A47C 7/006 297/344.19
2009/0161211 A1 * 6/2009 Jianguo .................. F16M 11/22 359/399
2009/0250565 A1 * 10/2009 Jaggers .................. A61G 13/12 248/166
2012/0019038 A1 * 1/2012 Mezzera .................. A47C 7/02 297/440.15
2016/0089286 A1 * 3/2016 Infantino ................. A61G 5/12 297/135
2021/0378406 A1 * 12/2021 Broyles ................ F16M 11/242
2025/0248523 A1 * 8/2025 Chen ........................ A47C 4/44

* cited by examiner

*Primary Examiner* — Camtu T Nguyen
(74) *Attorney, Agent, or Firm* — Pacer K. Udall; Booth Udall, PLC

(57) ABSTRACT

A medical jack stand is disclosed. A medical jack stand may include a support head. The support head may have voids formed in the support head. A pad may have fastening components disposed therein. A pad coupler is used to fasten the pad to the support head. The pad couplers may extend through the voids in the support head to couple to the fastening components disposed in the pad. A central support may be coupled to the support head by a swivel. A base may be coupled to the central support. Legs may be coupled to the base by a hinge and have a first locked position and a second locked position. In the first locked position, the legs may be parallel to one another.

15 Claims, 4 Drawing Sheets

MEDICAL JACK STAND

TECHNICAL FIELD

The described implementations relate generally to a medical jack stand. The medical jack stand may be used to position a limb or a residual limb.

SUMMARY

According to some implementations disclosed, a medical jack stand includes a support head having voids formed therein. The support head may support a pad. The pad may have fastening components disposed therein. A pad coupler may be configured to extend through one of the voids formed in the support head. Pad couplers attach to the fastening component disposed in the pad to couple the pad to the support head. In some implementations, a medical jack stand includes a central support coupled to the support head by a swivel. A base may be coupled to the central support. Legs may be hingedly coupled to the base. The legs may have a first locked position and a second locked position. In the first locked position, the legs may be parallel. In the second locked position, the legs may be splayed out to support the medical jack stand.

In some implementations, the medical jack stand includes a handle. The handle may be coupled to the base. The pad coupler may be a screw and the fastening component disposed in the pad may be a nut. The screw of the pad coupler may be configured to threadedly couple to the nut disposed in the pad. In some implementations, the pad coupler may include a hand knob. The medical jack stand may further include a strap that extends over the pad and is configured to hold a limb to the pad. In some implementations, the central support is height-adjustable.

According to some implementations, a medical jack stand may include a central support having a first end and a second end. The first end of the central support may be coupled to a support head by a swivel. A base may be coupled to the second end of the central support. A pad may be removably coupled to the support head.

The support head may have voids formed therein. The voids may be configured to receive pad coupling members. The pad coupling members may be configured to attach to fastening components coupled to the pad. In some aspects, the support head has attachment members extending from the support head that are configured to engage a fastening component disposed in the pad. The support head may also include pad attachment points configured to receive fastening components coupled to the pad. In some implementations, the medical jack stand may include a second pad that may be coupled to the support head.

According to some implementations, the medical jack stand's central support may have an adjustable length. In some implementations, the central support may include a gas strut. The gas strut may be actuated by a handle to change the length of the central support.

In some implementations, the base may include legs. The legs may be hingedly coupled to the base. One or more locking members may be coupled to the medical jack stand to lock the legs in various positions. For example, a locking member may be configured to hold the legs in a spread configuration.

According to some implementations disclosed, a medical jack stand includes a support head configured to receive a removeable pad. A central support may be coupled to the support head. A base may be coupled to the central support. Legs may be coupled to the base. The legs may have a first position and a second position. In the first position, the legs may be parallel to one another.

In some implementations, the legs may pivot from the first position to the second position. The legs may be configured to lock in both the first and the second position. The medical jack stand according to some implementations may include wheels coupled to the legs opposite the base.

The foregoing and other aspects, features, and advantages will be apparent to those artisans of ordinary skill in the art from the Description and Drawings, and from the Claims.

BRIEF DESCRIPTION OF THE DRAWINGS

The disclosure will be readily understood by the following detailed description in conjunction with the accompanying Drawings, wherein like reference numerals designate like structure elements, and in which:

FIG. 2 shows a medical jack stand with the legs folded in.

DESCRIPTION

Figure 1:
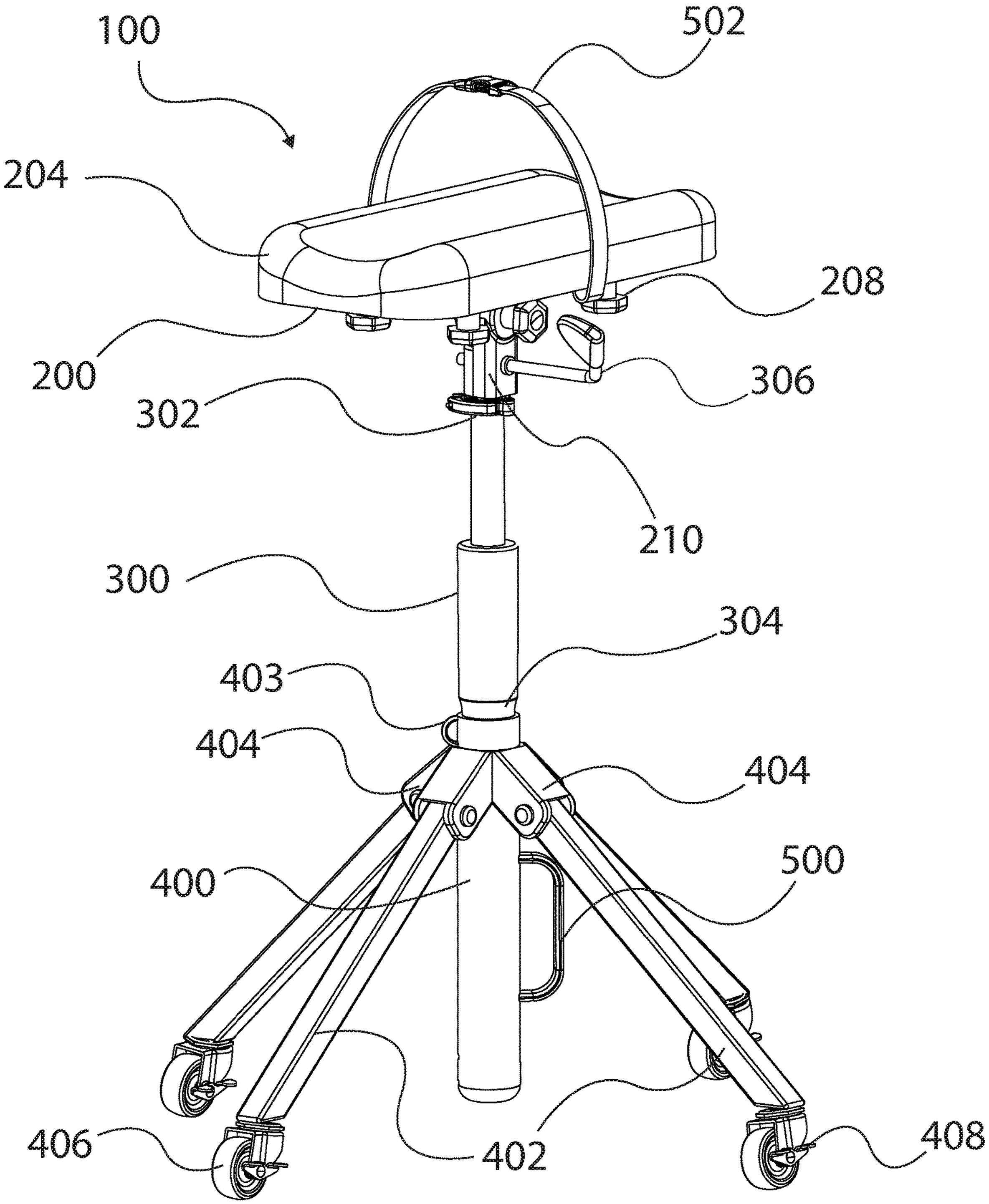
FIG. 1 shows a medical jack stand.

The present disclosure relates to a medical jack stand. Detailed aspects and applications the present disclosure may be understood more readily by reference to the following detailed Description and examples taken in connection with the accompanying Drawings, which form a part of this disclosure.

For the purposes of explanation, numerous specific structural and functional details disclosed herein in order to provide a thorough understanding of the various aspects and applications of a medical jack stand. It will be understood, however, by those skilled in the relevant art, that implementations of the medical jack stand disclosed herein may be practiced without these specific details and that they are not to be interpreted as limits, but merely as a basis for teaching one skilled in the art to employ the present disclosure. The full scope of the disclosure herein is not limited to the examples that are described below. Specific examples enable the disclosure to be better understood. However, they are given merely by way of guidance and do not imply any limitation.

TERMINOLOGY AND DEFINITIONS

In describing various medical jack stand implementations disclosed herein, the following terminology will be used in accordance with the definitions and explanations set out below. Notwithstanding, other terminology, definitions, and explanations may be found throughout this document as well. Unless specifically noted, it is intended that the words and phrases in the Description and Claims be given their plain, ordinary, and accustomed meaning to those of ordinary skill in the art. The inventor is fully aware that he can be his own lexicographer if desired. The inventor expressly elects, as his own lexicographer, to use only the plain and ordinary meaning of terms in the Description and Claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the Description and Claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Description or Claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred implementations, but in addition, include any and all structures, materials or acts that perform the claimed function as described in alternative implementations or forms of the disclosure, or that are well known present or later-developed, equivalent structures, material or acts for performing the claimed function.

The singular forms "a," "an," and "the" include plural referents unless the context clearly dictates otherwise. Thus, for example, reference to "an element" or "a step" includes reference to one or more of such elements or steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner.

The words "comprise" and "contain" and variations of the words, for example "comprising" and "comprises", mean "including but not limited to", and are not intended to (and do not) exclude other components.

The term "plurality", as used herein, means more than one.

All ranges are inclusive and combinable. When a range of values is expressed, another implementation includes from the one particular value and/or to the other particular value. Similarly, when values are expressed as approximations, by use of the antecedent "about," it will be understood that the particular value forms another implementation.

Implementations

As required, detailed implementations of the present disclosure are included herein. It is to be understood that the disclosed implementations are merely exemplary and may be embodied in various forms. Therefore, specific structural and functional details disclosed herein are not to be interpreted as limits, but merely as a basis for teaching one skilled in the art to employ the present disclosure. The specific examples below will enable the disclosure to be better understood. However, they are given merely by way of guidance and do not imply any limitation.

Reference will now be made in detail to representative implementations illustrated in the accompanying Drawings. It should be understood that the following descriptions are not intended to limit the implementations to one preferred implementation. To the contrary, it is intended to cover alternatives, modifications, and equivalents as can be included within the spirit and scope of the described implementations as defined by the Claims.

Generally, a medical jack stand is a versatile, modular support system designed to assist healthcare professionals in providing optimal, reliable, and flexible limb positioning for a wide range of medical applications, such as during medical procedures, rehabilitation, and physical therapy. The medical jack stand is also portable. The medical jack stand has an easy-to-use design that makes it useful in a home during recovery, in medical facilities, or in physical therapy offices. The medical jack stand includes detachable pads. The pad may be shaped to receive different limbs or residual limbs of a patient. For example, one pad may be formed with a tubular depression running along the length of the pad that is configured to receive and support the leg of a patient. Another pad may have a flat surface to support a different limb of a patient. Each pad may be coated with a non-slip coating to prevent the slippage of a limb on the pad. The pad may be mounted on a support head of the medical jack stand. The support head may have 360° rotational capability and have a tilting feature. The support head may rotate smoothly and tilt up or down to accommodate the various needs of the patient or the provider. This can position the limb at different angles. The medical jack stand may have a central support column to allow for the precise vertical movement of the support head and pad. The medical jacks stand may be portable and lightweight. In some implementations, the medical jack stand includes a foldable design that enables effortless transport between rooms or clinics without compromising durability or support. The support head and pad's modular design allows quick setup and reconfiguration making the medical jack stand useful in a wide variety of clinical environments.

The medical jack stand may include a base coupled to the central support column. Legs may extend from the base. The legs may be foldable relative to the base to permit the medical jack stand to adopt a more portable configuration. The legs may lock in either the folded or splayed position. In the splayed position, the legs are extended out from the base to support the medical jack stand.

The medical jack stand may include lockable wheels coupled to the end of the legs. The lockable wheels may be smooth rolling and allow for the stand to be easily moved to any location and securely locked in place, ensuring stability during use and safety for both the patient and the provider.

These and other aspects and implementations are discussed below with reference to the Drawings. However, those skilled in the art will readily appreciate that the detailed Description given herein with respect to the Drawings is for explanatory purposes only and should not be construed as limiting.

Specifically, as shown in FIG. 1 and for the exemplary purposes of this disclosure, a medical jack stand 100 may include support head 200. Support head 200 may support a pad 204. Pad 204 may be coupled to support head 200 by pad couplers 208. Support head 200 may include pad attachment points 202. Pad attachment points 202 may physically extend from support head 200 to engage fastening component 206 coupled to or disposed in pad 204. In some implementations, pad attachment points 202 may be voids formed in support head 200. The voids may be configured to receive pad couplers 208. For example, pad couplers 208 may extend through voids, or pad attachment points 202, formed in support head 200 to couple pad 204 to support head 200.

Figure 4:
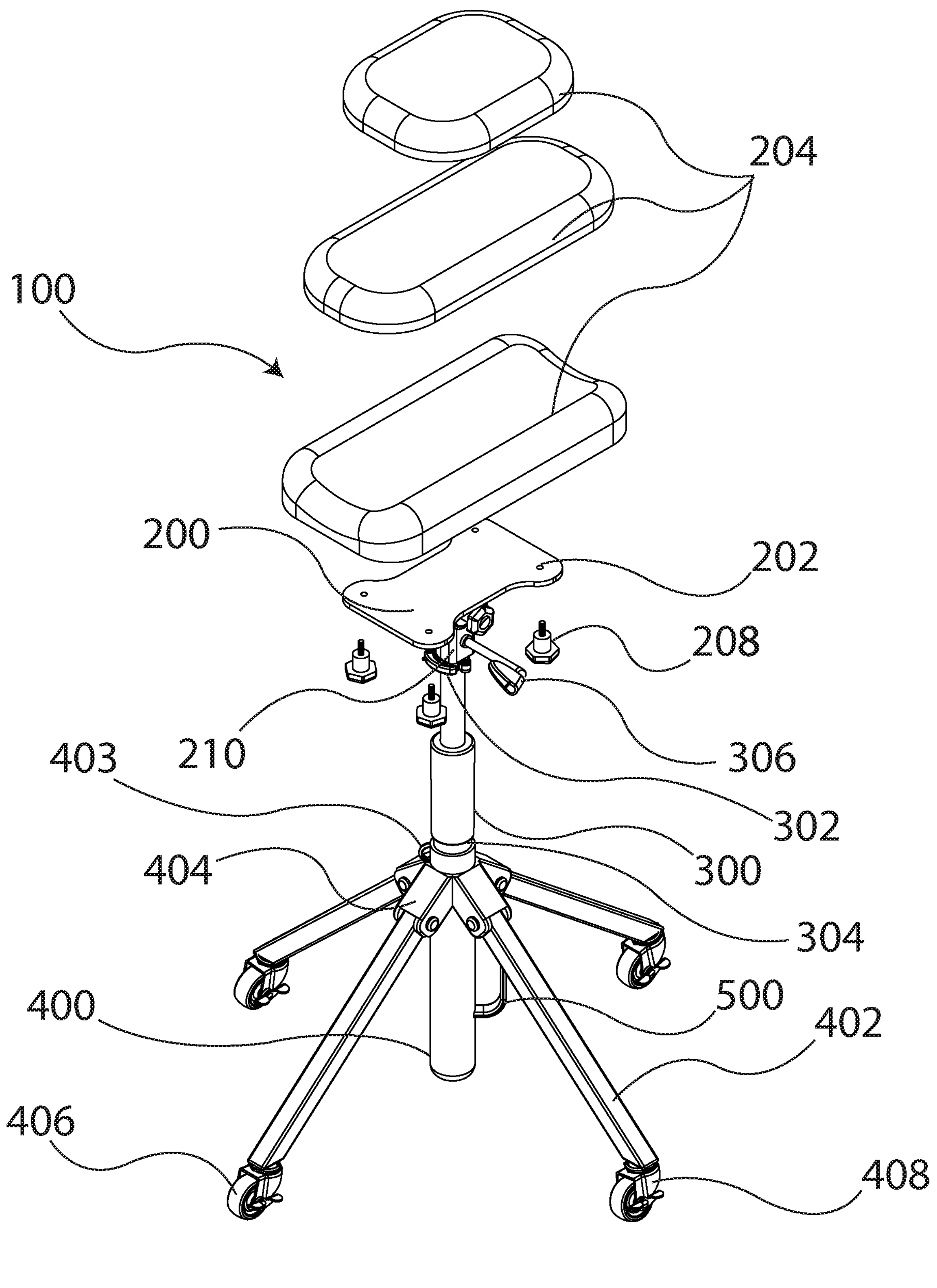
FIG. 4 shows an implementation of a medical jack with interchangeable pads.

In some implementations, pads 204 are coated in a non-slip material to reduce the movement of a limb supported on medical jack stand 100. Pads 204 may be made of a variety of materials. For example, pad 204 may be made of a foam. In some implementations, pads 204 may have a harder or softer feel as dictated by the needs of the patient and the provider. Pads 204 may have a variety of shapes of sizes. The shapes and sizes may correspond to different limb support needs. For example, a patient with a larger limb or residual limb may use a larger pad 204 and a patient with a smaller limb (a child, for example) may use a smaller pad 204. A single patient may also use multiple pads 204 with medical jack stand 100. For example, a patient may use pad 204 with a specific firmness during a physical therapy session and use a different pad 204 with a different firmness when using medical jack stand 100 to support a limb while the patient is relaxing. As shown in FIG. 4, medical jack stand 100 has multiple pad 204 options. Any one of pads 204 are configured to releasably couple to support head 200.

As stated, pads 204 are removably coupled to support head 200. In some implementations, pads 204 may have fastening components 206 disposed in the pad 204. Fastening components 206 may be configured to engage pad couplers 208 to couple pad 204 to support head 200. In such a configuration, fastening components 206 may be, for example, nuts configured to receive a threaded portion of pad coupler 208. Other types of fastening components 206 are contemplated. For example, in some implementations pad couplers 208 may be Velcro strips. One side of the Velcro strip is attached to pad 204 and the other side of the Velcro strip is attached to support head 200. In yet other implementations, fastening components 206 may be voids formed in pad 204 that are configured to receive extensions extending from support head 200. In some implementations, medical jack stand 100 may not include pad couplers 208 that extend into pad 204. Instead, pad couplers 208 may be either permanently or removably attached to pad 204 and configured to engage a receiving portion formed in support head 200. For example, support head 200 may have voids formed therein that are configured to receive pad coupler 208 that extends from pad 204. Pad couplers 208 may be configured to rotate once it passes through the void formed in support head 200 to lock pad 204 onto support head 200. Medical jack stand 100 may also include a strap 502. Strap 502 may be coupled to medical jack stand 100 in various ways and may be configured to secure a patient's limb to pad 204. In some implementations, strap 502 may be coupled to pad 204 such that each pad 204 may include its own strap 502. In some implementations, strap 502 may be coupled to support head 200 such that a single strap 502 may be used with any number of pads 204. Strap 502 may have an adjustable length so it can be tightened on the limb of the patient.

Pad couplers 208 may include handles to aid the user in securing pad 204 to support head 200. For example, pad couplers 208 may be a screw configured to engage fastening components 206 that is a nut disposed in pad 204. A handle may be coupled to pad couplers 208 opposite the screw to help the user have a larger and more easily graspable surface to twist pad couplers 208 into fastening components 206.

A swivel attachment 210 is attached to the support head 200. Swivel attachment 210 permits support head 200 to swivel 360 degrees and permits support head 200 to tilt. Swivel attachment 210 is also attached to central support 300. Central support 300 has a central support first end 302 and a central support second end 304. Swivel attachment 210 is attached to central support 300 at central support first end 302. Central support second end 304 is coupled to base 400. Central support 300 has a height adjustment handle. The height adjustment handle 306 may be used to raise the support head 200 to a higher or lower position depending on the needs of the patient or the caregiver. Central support 300 may include a gas strut. The gas strut may be actuated by moving height adjustment handle 306.

Base 400 is coupled to central support second end 304. Legs 402 extend from base 400. As shown in FIG. 1, legs 402 are coupled to base 400 by leg pivots 404. Leg pivots 404 allow the user to fold legs 402 out and retract legs 402 in. A handle 500 is coupled to base 400 to permit a user to carry medical jack stand 100 more conveniently. Handle 500 may be permanently coupled to base 400. For example, handle 500 may be a metal extension welded to the base 400. Wheels 406 are coupled to the opposite end of legs 402. Each wheel 406 may include a brake 408. Brake 408 may be used to lock wheels 406 to prevent the unwanted movement of medical jack stand 100.

In the folded in position, legs 402 may be parallel to one another and may also be parallel to central support 300 or base 400. As used herein, "parallel" does not mean perfectly parallel. One of skill in the art would recognize that legs 402 are parallel to one another in the folded in configuration. Legs 402 may not be exactly parallel but are sufficiently parallel that legs 402 are collapsed against base 400 of medical jack stand 100. One of skill in the art would recognize that there are many practical impediments that will make legs 402 not exactly parallel. For example, leg pivots 404 may be a hinge. The hinge itself may prevent legs 402 from lying perfectly parallel to one another in the collapsed configuration. Thus, one of skill in the art would recognize that "parallel" legs may not mean exactly parallel but encompasses a broader view of parallel. For example, legs 402 may be parallel as described herein even if any two legs 402 are parallel within 10 degrees. What matters is that legs 402 are sufficiently parallel to serve their intended purpose, even if they diverge by a few degrees.

Figure 2:
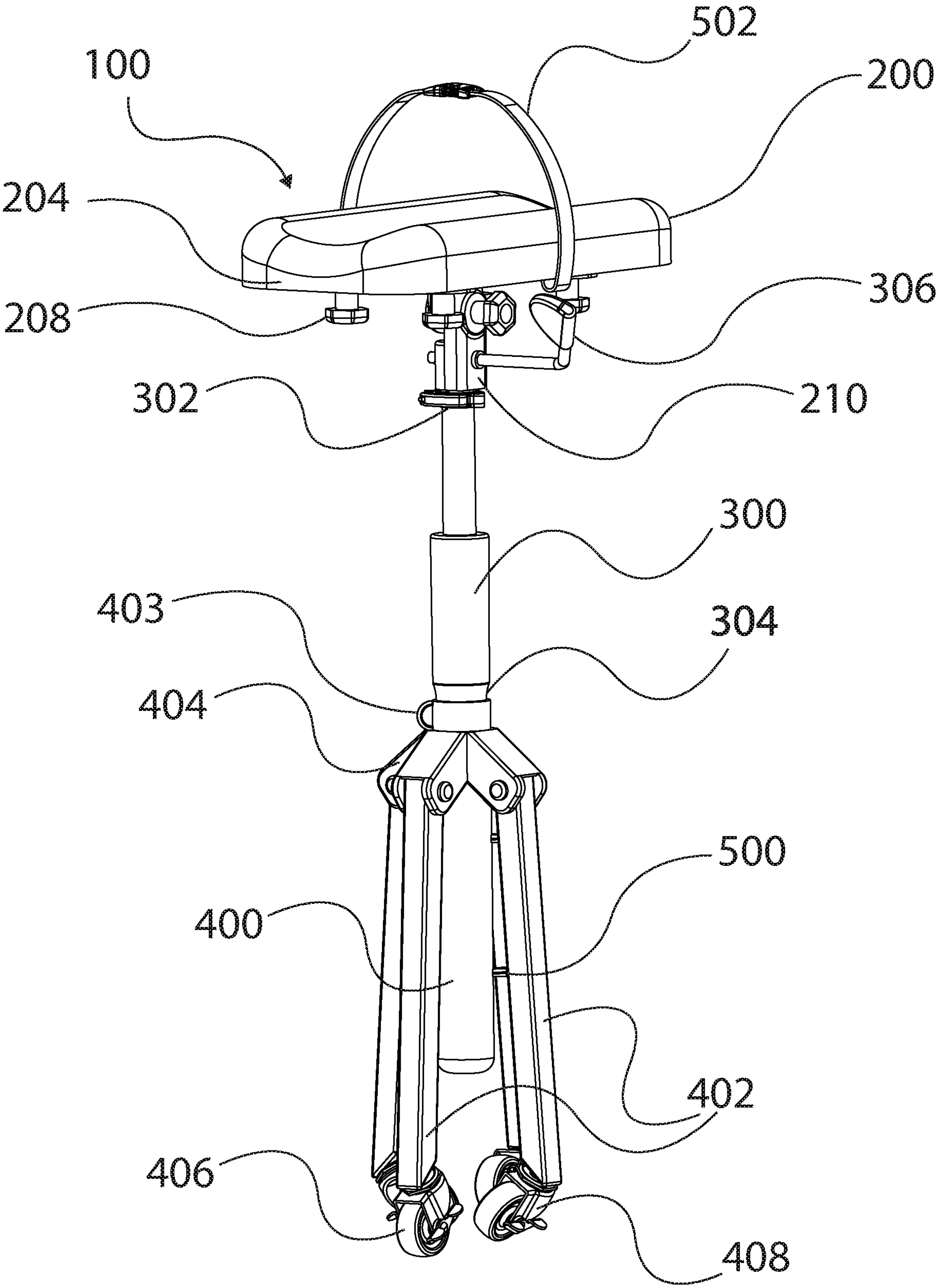

FIG. 2 shows medical jack stand 100 in a folded configuration. This shows legs 402 parallel to central support 300. In the folded configuration, medical jack stand 100 has legs 402 folded in at leg pivots 404 to be nearer to base 400. Leg pivots 404 may be any number of pivot types including, for example, a hinge. The hinge may permit the legs to pivot from a first position to a second position. In the first position, legs 402 may be parallel to base 400. In this configuration, medical jack stand 100 is configured for easy transport by a user. This configuration is shown in FIG. 2. In the second position, legs 402 may be splayed out from base 400. This configuration of legs 402 is shown in FIG. 1. Legs 402 in the second position provide support to medical jack stand 100. Legs 402 may be secured in the first position and the second position by a locking member 403. The locking member 403 may be, for example, a detent, a pin, a latch, a friction lock, or other suitable mechanism configured to hold legs 402 in the desired position. In some embodiments, such as the embodiment seen in FIG. 2, the locking member 403 may be an adjustment knob configured to secure a clamping mechanism integrated into each of the leg pivots 404. The clamping mechanism is configured to secure each of the legs 402 simultaneously when the adjustment knob is tightened and configured to unsecure each of the legs 402 simultaneously when the adjustment knob is loosened. The adjust knob may be tightened by manually rotating the knob in a first direction and may be loosened by manually rotating the adjustment knob in a second direction that is opposite the first direction.

Figure 3:
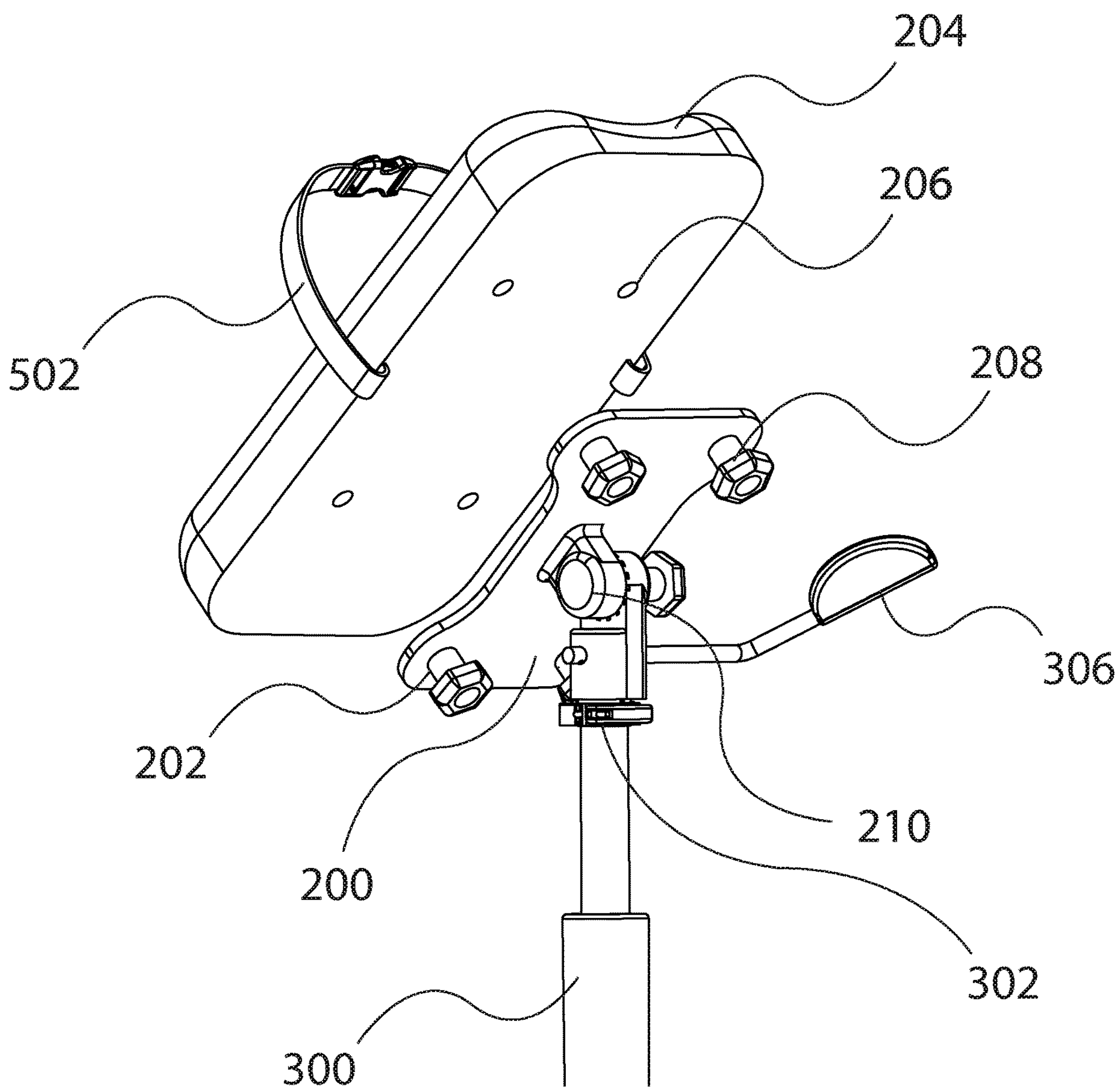
FIG. 3 shows a detailed exploded view of the medial jack stand of FIG. 1.

FIG. 3 shows an exploded view of medical jack stand 100. As shown, pad couplers 208 extend through voids, or pad attachment points 202, formed in support head 200. Pad couplers 208 are configured to engage fastening components 206 disposed in pad 204. FIG. 3 also shows support head 200 coupled to swivel attachment 210.

FIG. 4 shows a view of medical jack stand 100 according to some implementations. Medical jack stand 100 has pad 204 in various shapes and sizes. Support head 200 is configured to receive the different pads 204. As discussed above, the pad 204 may be shaped to receive and support different-sized patient limbs.

The foregoing descriptions of the specific implementations described herein are presented for purposes of illustration and description. These exemplary implementations are not intended to be exhaustive or to limit the implementations to the precise forms disclosed. All specific details described are not required in order to practice the described implementations.

The breadth and scope of the present disclosure should not be limited by any of the above-described exemplary implementations but should be defined only in accordance with the Claims and their equivalents.

Materials, Manufacture, and Assembly

It will be understood that implementations of a medical jack stand are not limited to the specific assemblies, devices and components disclosed in this document, as virtually any assemblies, devices and components consistent with the intended operation of a medical jack stand may be used. Accordingly, for example, although particular medical jack stands, and other assemblies, devices and components are disclosed, such may include any shape, size, style, type, model, version, class, measurement, concentration, material, weight, quantity, and/or the like consistent with the intended operation of medical jack stands. Implementations are not limited to uses of any specific assemblies, devices and components; provided that the assemblies, devices and components selected are consistent with the intended operation of a medical jack stand.

Accordingly, the components defining any medical jack stand may be formed of any of many different types of materials or combinations thereof that can readily be formed into shaped objects provided that the materials selected are consistent with the intended operation of a medical jack stand. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various medical jack stands may be manufactured using conventional procedures as added to and improved upon through the procedures described here. Some components defining a medical jack stand may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling medical jack stands are not limited to the specific order of steps as disclosed in this document. Any steps or sequence of steps of the assembly of a medical jack stand indicated herein are given as examples of possible steps or sequence of steps and not as limitations, since various assembly processes and sequences of steps may be used to assemble medical jack stands.

The implementations of a medical jack stand described above are by way of example or explanation and not by way of limitation. Rather, any description relating to the foregoing is for the exemplary purposes of this disclosure, and medical jack stand implementations may also be used with similar results for a variety of other applications.

It will be apparent to one of ordinary skill in the art that many modifications and variations are possible in view of the above teachings, and that by applying knowledge within the skill of the art, one may readily modify and/or adapt for various applications such specific implementations, without undue experimentation, without departing from the general concept of the present disclosure. Such adaptations and modifications are intended to be within the meaning and range of equivalents of the disclosed implementations, based on the teaching and guidance presented herein.

The Description section is intended to be used to interpret the claims. The Summary and Abstract sections may set forth one or more, but not all exemplary implementations of the present disclosure as contemplated by the inventor, and thus, are not intended to limit the present disclosure and the Claims.

What is claimed is:

1. A medical jack stand comprising:

a support head having at least one void formed therethrough;

a pad having at least one fastening component disposed therein corresponding to the at least one void;

at least one pad coupler configured to removably secure the pad to the support head, the at least one pad coupler extending from an outside of the support head through the at least one void formed in the support head and removably attaching to the at least one fastening component disposed in the pad;

a central support coupled to the support head by a swivel;

a base coupled to the central support;

a plurality of leg pivots fixedly coupled to the base; and a plurality of legs, each leg of the plurality of legs being hingedly coupled to the base through a corresponding leg pivot of the plurality of leg pivots, the plurality of legs having a folded position and a splayed position, wherein the plurality of legs are configured to lock in the splayed position, and wherein when the plurality of legs are in the folded position the plurality of legs are parallel.

2. The medical jack stand of claim 1, further comprising a handle coupled to the base, the handle coupled to the base at a first location and a second location, the first location axially displaced from the second location along an axis of the base.

3. The medical jack stand of claim 1, wherein the pad coupler is a threaded member and the fastening component is a threaded aperture configured to be threadedly coupled to the threaded member.

4. The medical jack stand of claim 3, wherein the pad coupler comprises a hand knob.

5. The medical jack stand of claim 1, further comprising a strap extending across the pad and configured to hold a limb to the pad.

6. The medical jack stand of claim 1, wherein the central support is height adjustable.

7. A medical jack stand comprising:

a central support having a first end and a second end;

a support head coupled to the first end of the central support by a swivel;

a base coupled to the second end of the central support;

a pad removably coupled to the support head;

a plurality of leg pivots fixedly coupled to the base; and a plurality of legs, wherein each leg of the plurality of legs is hingedly coupled to the base through a corresponding leg pivot of the plurality of leg pivots, the plurality of legs having a folded position and a splayed position, wherein the plurality of legs are configured to lock in the splayed position, and wherein when the plurality of legs are in the folded position the plurality of legs are parallel.

8. The medical jack stand of claim 7, wherein the support head has voids formed therein, the voids configured to receive pad coupling members, the pad coupling members configured to attach to fastening components coupled to the pad.

9. The medical jack stand of claim 7, wherein the support head further comprises pad attachment points configured to receive a fastening component coupled to the pad.

10. The medical jack stand of claim 7, further comprising a second pad.

11. The medical jack stand of claim 7, wherein the central support has an adjustable length.

12. The medical jack stand of claim 7, wherein the central support is an adjustable gas strut.

13. The medical jack stand of claim 12, further comprising a height adjustment handle configured to actuate a switch on the adjustable gas strut.

14. The medical jack stand of claim 7, wherein the support head has attachment members extending from the support head and configured to engage a fastening component disposed in the pad.

15. The medical jack stand of claim 7, further comprising a locking member configured to lock the plurality of legs in the splayed position.

* * * * *